United States Patent [19]
Tsuyuki

[11] Patent Number: 5,493,359
[45] Date of Patent: Feb. 20, 1996

[54] REAL-IMAGE VIEWFINDER FOR PHOTOGRAPHIC CAMERA

[75] Inventor: Kazuhiro Tsuyuki, Saitama, Japan

[73] Assignee: Fuji Photo Co., Ltd., Ohmiya, Japan

[21] Appl. No.: 321,899

[22] Filed: Oct. 17, 1994

[30] Foreign Application Priority Data

Oct. 18, 1993 [JP] Japan ................................. 5-259542

[51] Int. Cl.$^6$ ........................... G03B 13/10; G03B 37/04
[52] U.S. Cl. ............................. 354/222; 365/94
[58] Field of Search ...................... 354/222, 94

[56] References Cited

U.S. PATENT DOCUMENTS

| | | | |
|---|---|---|---|
| 1,146,887 | 7/1915 | Lawson | 354/222 |
| 4,478,493 | 10/1984 | Yokota | 354/222 |
| 5,410,381 | 4/1995 | Kameyama et al. | 354/222 |
| 5,430,517 | 7/1995 | Zander | 354/222 |

FOREIGN PATENT DOCUMENTS

| | | | |
|---|---|---|---|
| 5-142626 | 6/1993 | Japan | 354/222 |
| 6-35033 | 2/1994 | Japan | 354/222 |

*Primary Examiner*—Michael L. Gellner
*Assistant Examiner*—Michael Dalakis
*Attorney, Agent, or Firm*—Fish & Richardson

[57] ABSTRACT

A real-image viewfinder for a variable-exposure camera has a mask member having a field frame for defining a field of view of the viewfinder, and a mask drive mechanism which moves the mask member between an operative position in which the mask member is positioned in an image surface of an optical system of the viewfinder so that the field frame is viewed through an eyepiece of the viewfinder and a retracted position in which the mask member is retracted from the optical path of light bundle passing through the optical system. A transparent support member having a smooth surface is disposed so that the smooth surface is positioned in the image surface of the optical system of the viewfinder and the mask member is formed of an elastic material having a flexibility. The mask drive means moves the mask member so that the mask member is brought into close contact with the smooth surface of the support member under the elasticity of the mask member itself in the operative position.

6 Claims, 5 Drawing Sheets

REAL-IMAGE VIEWFINDER FOR PHOTOGRAPHIC CAMERA

BACKGROUND OF THE INVENTION

1. Field of the Invention

This invention relates to a real-image viewfinder for a photographic camera, and more particularly to a real-image viewfinder for a variable-exposure-size photographic camera in which the field of view of the viewfinder is changed by an improved mechanism.

2. Description of the Prior Art

There has been an increasing demand for miniaturization of cameras from the viewpoint of popularization of cameras, and various miniaturized cameras have been developed and put into practice. Though there has been known a mini size camera using a special small size film, there is a problem that resolution of the picture deteriorates and sharpness of the image deteriorates as the film size decreases and at the same time such a special small size film is less available. Accordingly, it is preferred that the camera be miniaturized while using common films.

Recently, a real-image viewfinder has come into wide use, and it is preferred that even a camera having a real-image viewfinder be as small as possible. In the real-image viewfinder, an inverted image of an object is once formed through a convex object lens and then the inverted image is further inverted into an erected image through an erecting prism system. The erected image is magnified through a convex eyepiece. In some cameras with a real-image viewfinder, a mask having a field frame is positioned in the image surface so that the field frame is viewed through the finder window.

Recently there has been put into practice a variable-exposure-size photographic camera in which the exposure size (the size and/or the aspect ratio of the picture) can be switched between normal size and panoramic size. Such a variable-exposure-size photographic camera is provided with a pair of masks having different field frames, one for the normal size and the other for the panoramic size, and a field frame switching mechanism selectively positions masks for the panoramic size in an operative position in the image surface or in a retracted position away from the light bundle passing through the optical system of the viewfinder while the mask for the normal size is kept stationary in the image surface.

FIGS. 11A and 11B respectively show examples of conventional field frame switching mechanisms. In the example shown in FIG. 11A, a panoramic-size mask 30 is positioned beside an image surface 13 as shown by the solid line while the normal-size mask (not shown) is kept stationary in the image surface 13 when the normal-size exposure is selected, and is inserted in the image surface 13 over the normal-size mask as shown by the broken line when the panoramic-size exposure is selected. In the example shown in FIG. 11B, the panoramic-size mask comprises upper and lower halves 31A and 31B, and the upper and lower halves 31A and 31B are moved toward each other into the image surface 13 when the panoramic-size exposure is selected while are kept above and below the image surface 13 when the normal-size exposure is selected.

However, since the panoramic-size mask should be as close to the image surface as possible when it is in the operative position, the mechanism for driving the panoramic-size mask is very complicated in the conventional field frame switching mechanisms.

SUMMARY OF THE INVENTION

In view of the foregoing observations and description, the primary object of the present invention is to provide a real-image viewfinder in which the field frame switching mechanism is simple in structure and compact in size.

In accordance with the present invention, there is provided a real-image viewfinder for a variable-exposure camera comprising a mask member having a field frame for defining a field of view of the viewfinder, and a mask drive means which moves the mask member between an operative position in which the mask member is positioned in an image surface of an optical system of the viewfinder so that the field frame is viewed through an eyepiece of the viewfinder and a retracted position in which the mask member is retracted from the optical path of light bundle passing through the optical system, wherein the improvement comprises that a transparent support member having a smooth surface is disposed so that the smooth surface is positioned in the image surface of the optical system of the viewfinder, said mask member is formed of an elastic material having a flexibility, and said mask drive means moves the mask member so that the mask member is brought into close contact with the smooth surface of the support member under the elasticity of the mask member itself in said operative position.

In the real-image viewfinder of the present invention, the mask member is positioned in place in the image surface by causing the mask member into close contact with the support member under its own elasticity. Accordingly, the mechanism for positioning the mask member in the image surface can be simple in structure, whereby the field frame switching mechanism may be simple in structure and compact in size.

In one embodiment of the present invention, one of optical elements in the viewfinder such as a Porro prism, an eyepiece, an object lens and the like doubles as the support member.

This permits further simplification of the field frame switching mechanism.

DESCRIPTION OF THE PREFERRED EMBODIMENTS

Figure 1A:
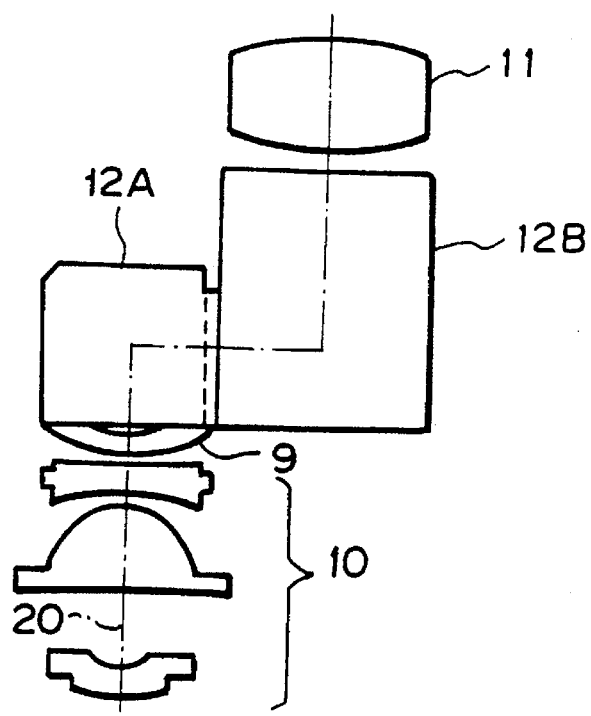
FIG. 1A is a plan view of an optical system of a real-image viewfinder.
Figure 1B:
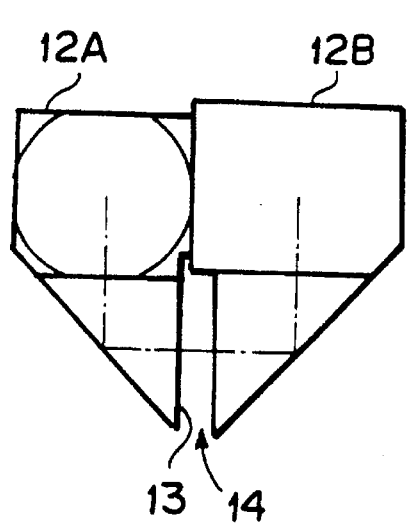
FIG. 1B is a showing Porro prisms.
Figure 1C:
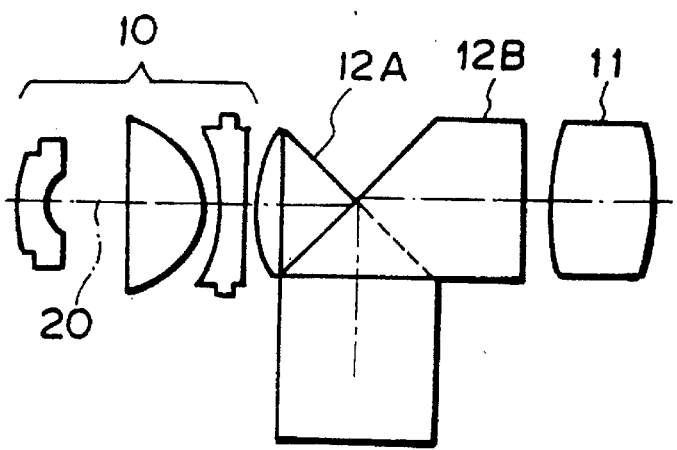
FIG. 1C is a side view of the optical system shown in FIG. 1A.

In FIGS. 1A to 1C, a real-image viewfinder in accordance with an embodiment of the present invention comprises an object lens group 10, an eyepiece 11, first and second Porro prisms 12A and 12B disposed between the object lens group 10 and the eyepiece 11, and a field lens 9 disposed on the light incident face of the first Porro prism 12A. The object lens group 10 comprises a concave lens, a convex lens for reducing the magnification and a concave lens arranged in this order from the object side. The eyepiece 11 comprises a single convex lens.

Figure 4:
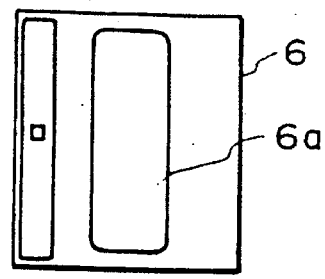
FIG. 4 is a schematic view showing the panoramic-size mask.

The first and second Porro prisms 12A and 12B are opposed to each other intervening therebetween a predetermined space 14, and an image surface is on the surface 13 of the first Porro prism 12A opposed to the second Porro prism 12B. The Porro prisms 12A and 12B are disposed in a predetermined casing (not shown). A panoramic-size mask 6 shown in FIG. 4 is inserted into and retracted from the space 14 when the field frame is switched between the normal size and the panoramic size.

Figure 2A:
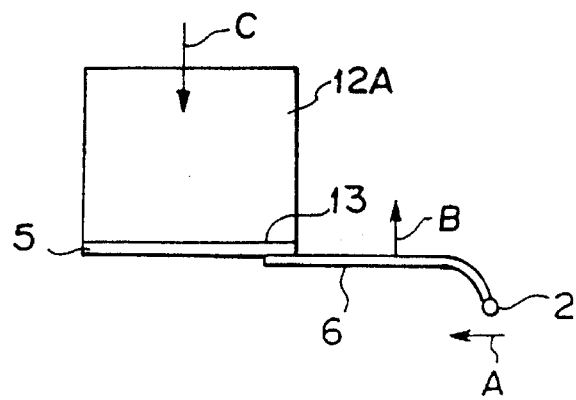
FIG. 2A is a schematic view for illustrating a state of a viewfinder in accordance with a first embodiment of the present invention in which the field of view of the viewfinder is set to the normal size.
Figure 2B:
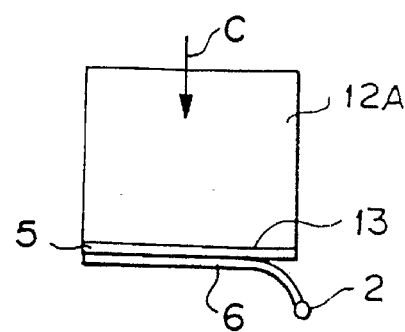
FIG. 2B is a schematic view for illustrating a state of the viewfinder in which the field of view of the viewfinder is set to the panoramic size.
Figure 3:
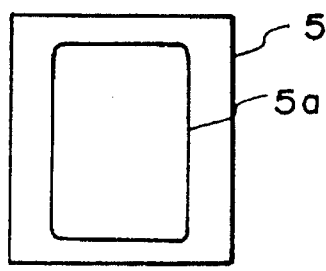
FIG. 3 is a schematic view of the normal-size mask.

As shown in FIGS. 2A and 2B, a normal-size mask 5 is fixedly disposed on the image surface 13. The normal-size mask 5 has a normal-size field frame 5a as shown in FIG. 3. The panoramic-size mask 6 has a panoramic-size field frame 6a as shown in FIG. 4.

The panoramic-size mask 6 is formed of an elastic material having a flexibility (e.g., a thin resin plate) and is fixed to a drive means 2 at one edge thereof. When the normal-size exposure is selected, the panoramic-size mask 6 is held in a retracted position as shown in FIG. 2A. In the retracted position, the panoramic-size mask 6 is held by the drive means 2 with the free edge portion in abutment against an edge portion of the normal-size mask 5. The panoramic-size mask 6 is resiliently bent at a portion near the drive means 2 and accordingly is urged toward the image surface 13 in the direction of arrow B under its own elasticity which acts.

A light bundle passing through the object lens group 10 and the field lens 9 and enters the first Porro prism 12A in the direction of arrow C forms an image on the image surface 13 and emanates through the eyepiece 11. When the panoramic-size mask 6 is in the retracted position, the field of view through eyepiece 11 is defined by the normal-size field frame 5a of the normal-size mask 5.

Figure 5:
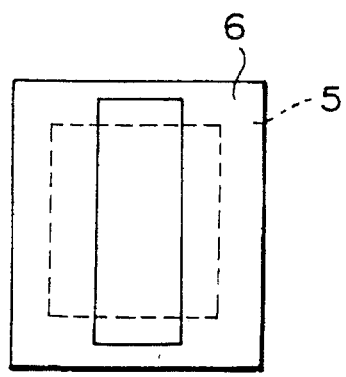
FIG. 5 is a schematic showing the relation between the normal-size mask and the panoramic-size mask when the panoramic-size mask is in the operative position.

When the panoramic-size exposure is selected, the panoramic-size mask 6 is moved by the drive means 2 in the direction of arrow A in FIG. 2A to an operative position shown in FIG. 2B where the panoramic-size mask 6 is positioned over the normal-size mask 5 as shown in FIG. 5. When moved to the operative position, the panoramic-size mask 6 is slid on the normal-size mask 5 while being pressed against the normal-size mask 5 under its own elasticity. When the panoramic-size mask 6 is in the operative position, the field of view through eyepiece 11 is defined by the panoramic-size field frame 6a of the panoramic-size mask 6. In the operative position, the panoramic-size mask 6 is pressed against the image surface 13 under its own elasticity into close contact with the image surface 13 (or the normal-size mask 5). Accordingly, the drive means 2 need not adjust the position of the panoramic-size mask 6 in the direction of the optical axis of the optical system of the viewfinder, whereby the drive means 2 may be simple in structure and compact in size.

In response to movement of the panoramic-size mask 6 to the operative position, an aperture frame (not shown) for the panoramic size is moved in front of the film (not shown) in the camera.

When the normal-size exposure is subsequently selected, the drive means 2 returns the panoramic-size mask 6 to the retracted position shown in FIG. 2A and the field of view through eyepiece 11 comes to be defined by the normal-size mask 5 on the image surface 13. In response to movement of the panoramic-size mask 6 to the retracted position, the aperture frame for the panoramic size is retracted.

Figure 6:
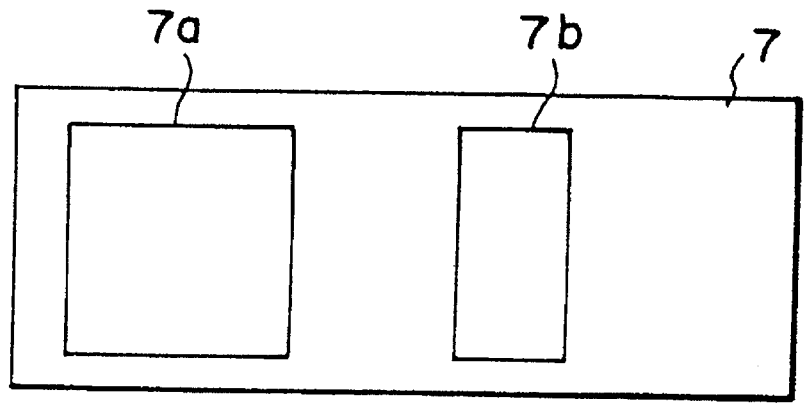
FIG. 6 is a schematic view showing a mask employed in a viewfinder in accordance with a second embodiment of the present invention.
Figure 7A:
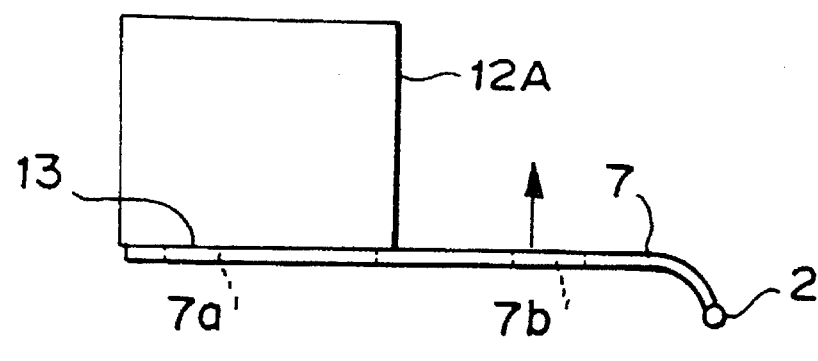
FIG. 7A is a schematic view for illustrating a state of a viewfinder of the second embodiment in which the field of view of the viewfinder is set to the normal size.
Figure 7B:
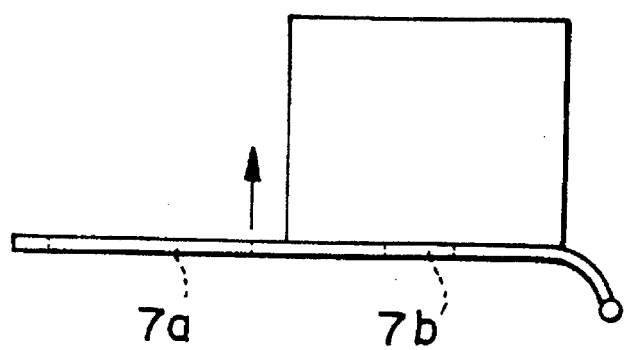
FIG. 7B is a schematic view for illustrating a state of the viewfinder in which the field of view of the viewfinder is set to the panoramic size.

In the embodiment described above, the normal-size mask 5 is held stationary on the image surface 13 and only the panoramic-size mask 6 is moved between the operative position and the retracted position. In contrast, in the embodiment shown FIGS. 6, 7A and 7B, a normal-size field frame 7a and a panoramic-size field frame 7b are contiguously formed in a single mask 7 formed of an elastic material having a flexibility and the mask 7 is moved between a normal-size position where the normal-size field frame 7a is positioned on the image surface 13 as shown in FIG. 7A and a panoramic-size position where the panoramic-size field frame 7b is positioned on the image surface 13 as shown in FIG. 7B. When the mask 7 is moved between the normal-size position and the panoramic-size position, it is kept in close contact with the image surface 13 under its own elasticity.

Though, in the embodiments described above, the image surface 13 is on a surface of an optical element (on a surface of the first Porro prism 12A in the particular embodiments), the image surface need not be on a surface of an optical element but may be in a space between the optical elements.

Figure 8:
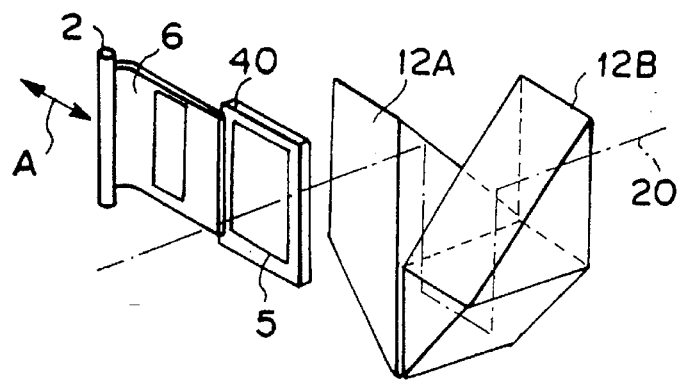
FIG. 8 is a schematic perspective view showing a viewfinder in accordance with a third embodiment of the present invention.

That is, as shown in FIG. 8, when the image surface is in a space between the optical elements of the viewfinder, a transparent support member 40 having a smooth surface is provided and positioned so that the smooth surface coincides with the image surface. A normal-size field frame is provided on the smooth surface of the support member 40 and a panoramic-size mask 5 is moved between the retracted position and the operative position in the same manner as described above in conjunction with FIGS. 2A and 2B.

Figure 9:
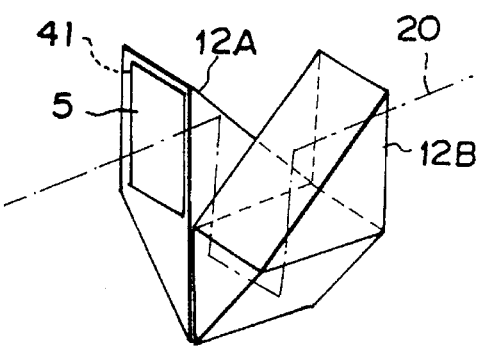
FIG. 9 is a view for illustrating a fourth embodiment of the present invention.
Figure 10A:
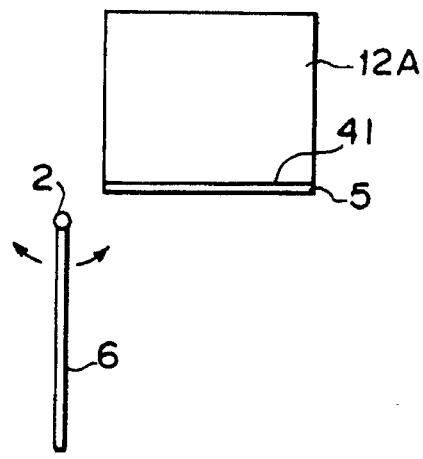
FIG. 10A is a schematic view for illustrating a state of a viewfinder of the fourth embodiment in which the field of view of the viewfinder is set to the normal size.
Figure 10B:
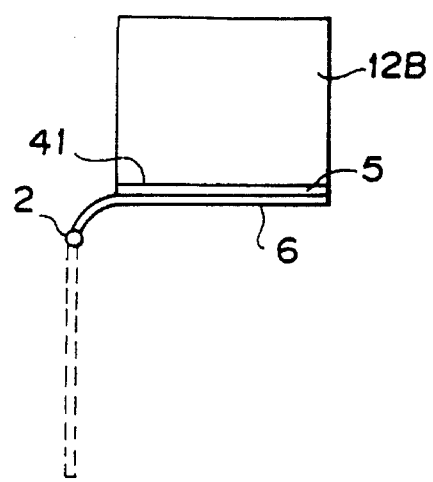
FIG. 10B is a schematic view for illustrating a state of the viewfinder in which the field of view of the viewfinder is set to the panoramic size.
Figure 11A:
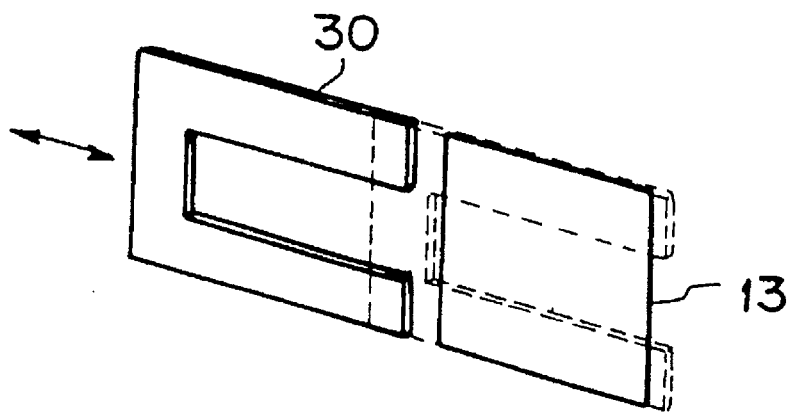
FIGS. 11A and 11B are schematic views for illustrating viewfinders in accordance with the prior art.
Figure 11B:
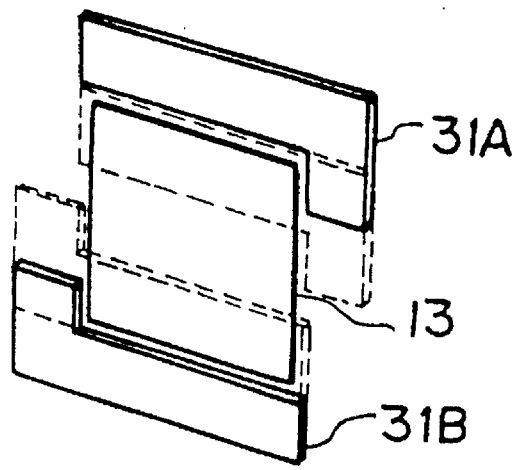

In the embodiment shown in FIGS. 9, 10A and 10B, the image surface is on the light incident face 41 (reference numeral 20 denotes a light bundle passing through the optical system of the viewfinder), and a normal-size mask 5 is provided on the light incident face 41. An edge portion of a panoramic-size mask 6 is fixed to a drive means 2 which is rotatable about its longitudinal axis. The panoramic-size mask 6 is rotated between a retracted position shown in FIG. 10A and an operative position shown in FIG. 10B. In the operative position, the panoramic-size mask 6 is pressed against the face 41 in close contact therewith under its own elasticity.

What is claimed is;

1. A real-image viewfinder for a variable-exposure camera comprising a mask member having a field frame for defining a field of view of the viewfinder, and a mask drive means which moves the mask member between an operative position in which the mask member is positioned in an image surface of an optical system of the viewfinder so that the field frame is viewed through an eyepiece of the viewfinder and a retracted position in which the mask member is retracted from the optical path of light bundle passing through the optical system, wherein the improvement comprises that a transparent support member having a smooth surface is disposed so that the smooth surface is positioned in the image surface of the optical system of the viewfinder, said mask member is formed of an elastic material having a flexibility, and said mask drive means moves the mask member so that the mask member is brought into close contact with the smooth surface of the support member under the elasticity of the mask member itself in said operative position.

2. A real-image viewfinder as defined in claim 1 in which one of optical elements of said optical system doubles as the support member.

3. A real-image viewfinder as defined in claim 1 in which a normal-size mask member having a normal-size field frame is held stationary on the smooth surface of the support member and another mask member having a field frame different from the normal-size field frame is moved between the operative position and the retracted position.

4. A real-image viewfinder as defined in claim 1 in which said mask member is slid on the smooth surface of the mask member while being pressed against the smooth surface under its own elasticity when it is moved between the operative position and the retracted position.

5. A real-image viewfinder as defined in claim 1 in which said mask member is rotated between the operative position and the retracted position.

6. A real-image viewfinder for a variable-exposure camera comprising a mask member having a plurality of field frames for defining different fields of view of the viewfinder, a mask drive means which moves the mask member between a plurality of predetermined positions in which respective field frames are selectively positioned in an image surface of an optical system of the viewfinder, and a transparent support member having a smooth surface disposed so that the smooth surface is positioned in the image surface of the optical system of the viewfinder, said mask member being formed of an elastic material having a flexibility, and said mask drive means moving the mask member so that the mask member is brought into close contact with the smooth surface of the support member under the elasticity of the mask member itself in each of said predetermined positions.

* * * * *